(12) United States Patent
Kaneko et al.

(10) Patent No.: US 6,694,865 B2
(45) Date of Patent: Feb. 24, 2004

(54) BELT GUIDE MECHANISM (75) Inventors: Junya Kaneko, Abiko (JP); Tetsuya Naruse, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 90 days.

(21) Appl. No.: 10/131,092

(22) Filed: Apr. 25, 2002

(65) Prior Publication Data

US 2002/0157922 A1 Oct. 31, 2002

(30) Foreign Application Priority Data

Apr. 25, 2001 (JP) ....................................... 2001-128360

(51) Int. Cl.[7] ................................................ F09B 29/00
(52) U.S. Cl. ......................................... 92/88; 92/169.1
(58) Field of Search .................................. 92/88, 169.1

(56) References Cited

U.S. PATENT DOCUMENTS 4,545,290 A * 10/1985 Lieberman ..................... 92/88
4,813,341 A * 3/1989 Vaughn ......................... 92/88
5,555,789 A * 9/1996 Rosengren et al. ........ 92/165 R
6,007,247 A * 12/1999 Rosengren et al. ............ 92/88
6,109,166 A * 8/2000 Granberg ...................... 92/88
6,253,660 B1 * 7/2001 Noda et al. ................... 92/88
6,336,393 B1 * 1/2002 LeMire et al. ................. 92/88

OTHER PUBLICATIONS

U.S. patent application Ser. No. 10/131,093, filed on Apr. 25, 2002, status pending.

* cited by examiner

Primary Examiner—Edward K. Look
Assistant Examiner—Igor Kershteyn
(74) Attorney, Agent, or Firm—Paul A. Guss (57) ABSTRACT

Belt guide members guide an upper belt and a lower belt for closing a slit of a cylinder tube. Belt holder sections for the upper belt and belt separators for separating the upper belt and the lower belt from each other are integrally formed in the belt guide members. Bearings for positioning a slider are disposed to engage with the belt guide members.

8 Claims, 9 Drawing Sheets

BELT GUIDE MECHANISM

BACKGROUND OF THE INVENTION

1. Field of the Invention

The present invention relates to a belt guide mechanism. Specifically, the present invention relates to a belt guide mechanism for guiding an upper belt and a lower belt for sealing an axial slit of a cylinder tube of a rodless cylinder.

2. Description of the Related Art

Figure 9:
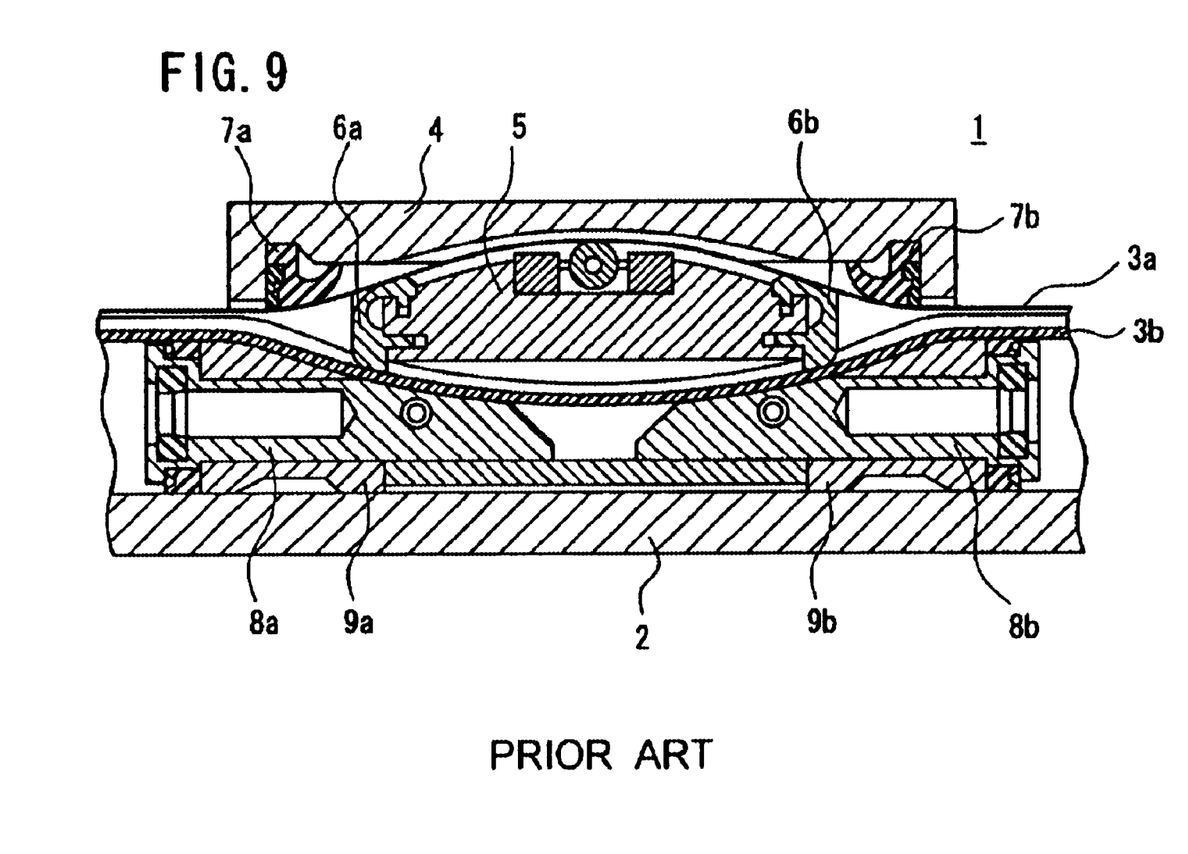
FIG. 9 is, with partial omission, a longitudinal sectional view illustrating a rodless cylinder having a conventional belt guide mechanism.

As shown in FIG. 9, a rodless cylinder 1 is used as a means for transporting a workpiece. The rodless cylinder 1 has a seal belt 3a for avoiding entry of dust or the like from an unillustrated slit formed through the upper surface of a cylinder tube 2, and a seal belt 3b for keeping the interior of the cylinder tube 2 airtight.

The pair of seal belts 3a, 3b are disposed integrally with a slider 4. The pair of seal belts 3a, 3b are guided by belt separators 6a, 6b which are connected to both ends of a piston yoke 5, holder plates 7a, 7b, and upper surfaces of wear rings 9a, 9b. Pistons 8a, 8b are inserted respectively inside the wear rings 9a, 9b.

In the conventional rodless cylinder 1, sliding sections of the pair of seal belts 3a, 3b are guided by guide members of six or more parts (for example, the pair of belt separators 6a, 6b, the pair of holder plates 7a, 7b, and the pair of wear rings 9a, 9b) disposed on both sides of the seal belts 3a, 3b.

However, the assembling operability and the operation efficiency are unsatisfactory because a number of the guide members for guiding the seal belts 3a, 3b is large. Further, the dimensional accuracy of the guide member and the positional accuracy upon the assembling are unsatisfactory due to the influence of the dimensional error of the respective guide members.

Further, the sliding resistance is large between the seal belts 3a, 3b and the guide members, and the durability of the seal belts 3a, 3b and the guide members is low.

Furthermore, the cost is high because the number of components making up the guide members is large.

SUMMARY OF THE INVENTION

It is a general object of the present invention to provide a belt guide mechanism which reduces a number of components for guiding a first belt (upper belt) and a second belt (lower belt), thereby enabling the assembling operability to be improved.

A principal object of the present invention is to provide a belt guide mechanism which improves durability of a belt guide member.

Another object of the present invention is to provide a belt guide mechanism which reduces the cost.

According to the present invention, a first guide member has a belt separator for separating a first belt (upper belt) and a second belt (lower belt) from each other, and a holder section for pressing the first belt. The belt separator and the holder section are integrally disposed in the first guide member. Accordingly, it is possible to reduce the number of components. Therefore, it is possible to further improve the assembling operability and the operation efficiency.

The guide member conventionally made up of a belt separator and a holder plate is integrated into only a first guide member. Accordingly, there is no dimensional error which conventionally generates between the belt separator and the holder plate. Therefore, it is possible to improve the dimensional accuracy of the belt guide member.

That is, the dimensional and positional accuracy of the first guide member is improved for the first belt and the second belt to follow the first guide member with improved performance. Therefore, the sliding resistance is reduced for further improving the durability of the first and second belts and the first and second guide members.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
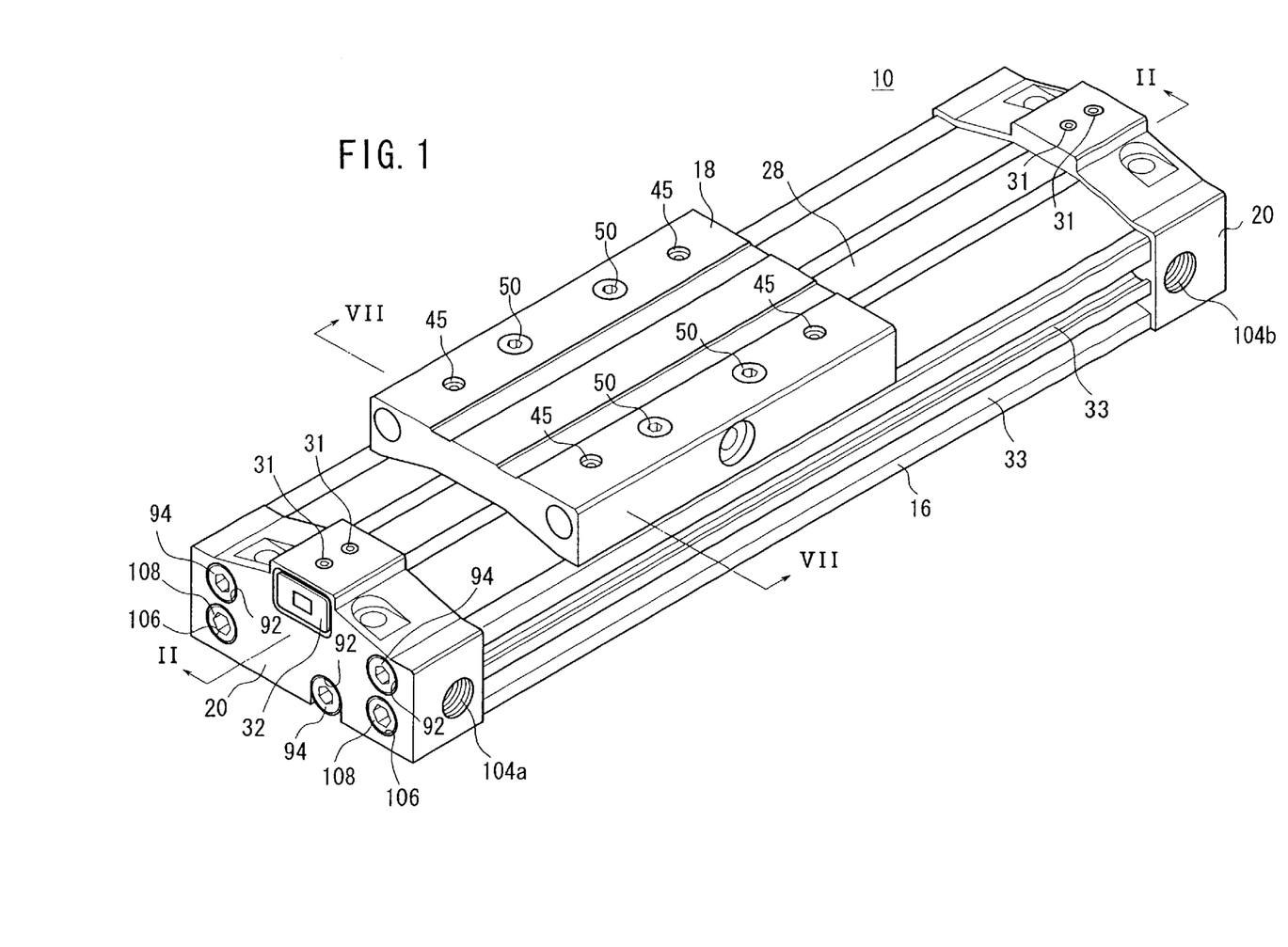
FIG. 1 is a perspective view illustrating a rodless cylinder incorporating a belt guide mechanism according to an embodiment of the present invention.

In FIG. 1, reference numeral 10 indicates a rodless cylinder incorporating a belt guide mechanism 12 according to an embodiment of the present invention.

The rodless cylinder 10 comprises a cylinder tube 16, a slider 18 which is attached to the cylinder tube 16 and which is longitudinally movable back and forth, and a pair of end plates 20 which are attached to both ends of the cylinder tube 16.

The rodless cylinder 10 further comprises a belt guide mechanism 12 (see FIG. 4) which guides an upper belt (first belt) 28 and a lower belt (second belt) 30 as described later on, and bearing sections 14 (see FIG. 4) which engageably support lower portions of the slider 18.

Figure 4:
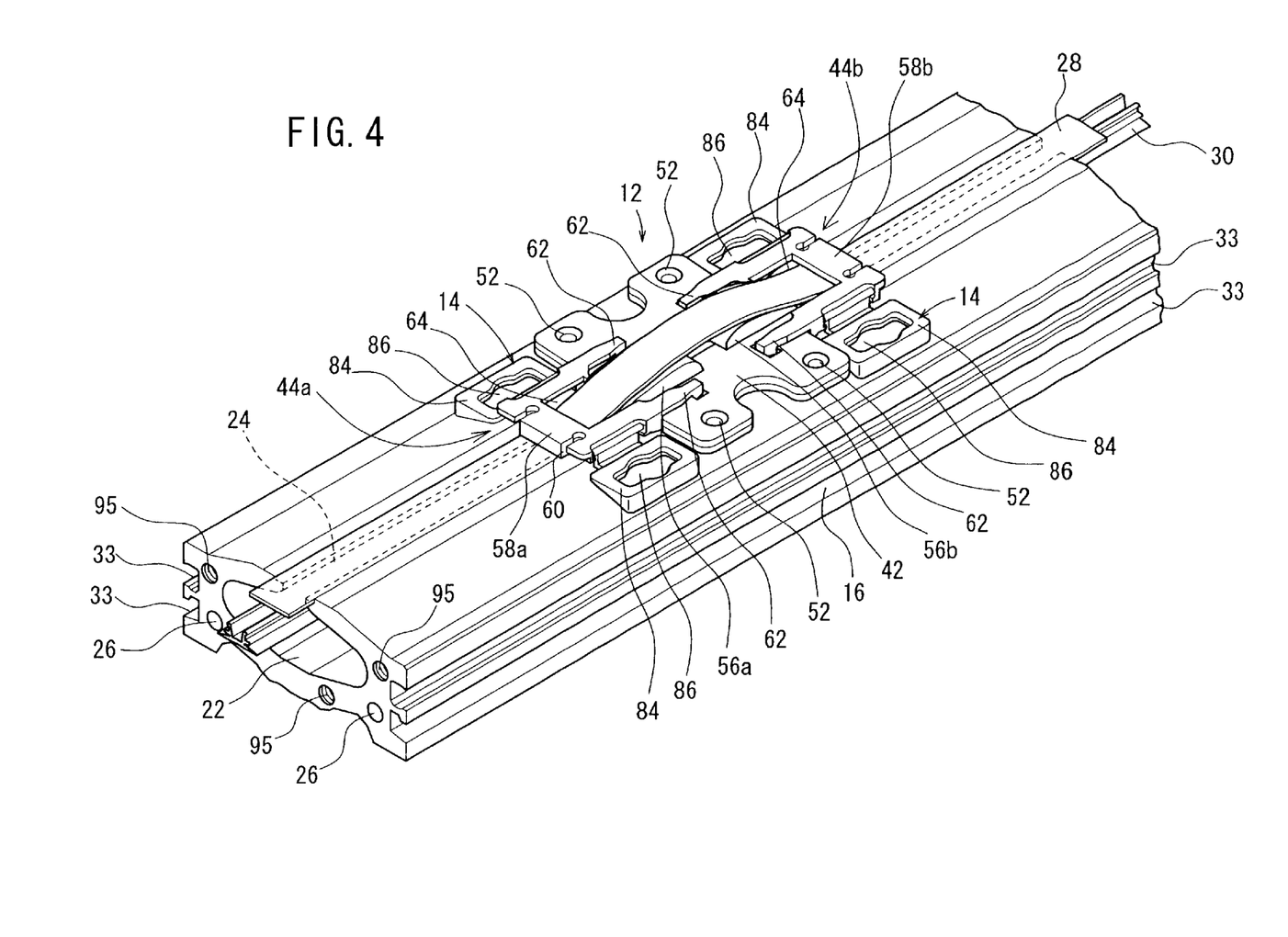
FIG. 4 is, with partial omission, a perspective view illustrating the belt guide mechanism.

As shown in FIG. 4, a bore 22 is formed longitudinally in the cylinder tube 16 and has a substantially rhombic cross section. A slit 24 is formed longitudinally through the upper surface of the cylinder tube 16. The bore 22 communicates externally through the slit 24. Fluid bypass passages 26 for centralized piping are formed under the bore 22 in the cylinder tube 16. The fluid bypass passages 26 extend along the bore 22.

Unillustrated magnetic members are installed to both sides of the slit 24 on the upper surface of the cylinder tube 16 for tightly contacting the upper belt 28 as described later on.

The upper belt 28 and a lower belt 30 are attached to the slit 24 of the cylinder tube 16 for vertically closing and sealing the slit 24. For example, the upper belt 28 is made of a metal material and the lower belt 30 is made of a resin material.

Figure 2:
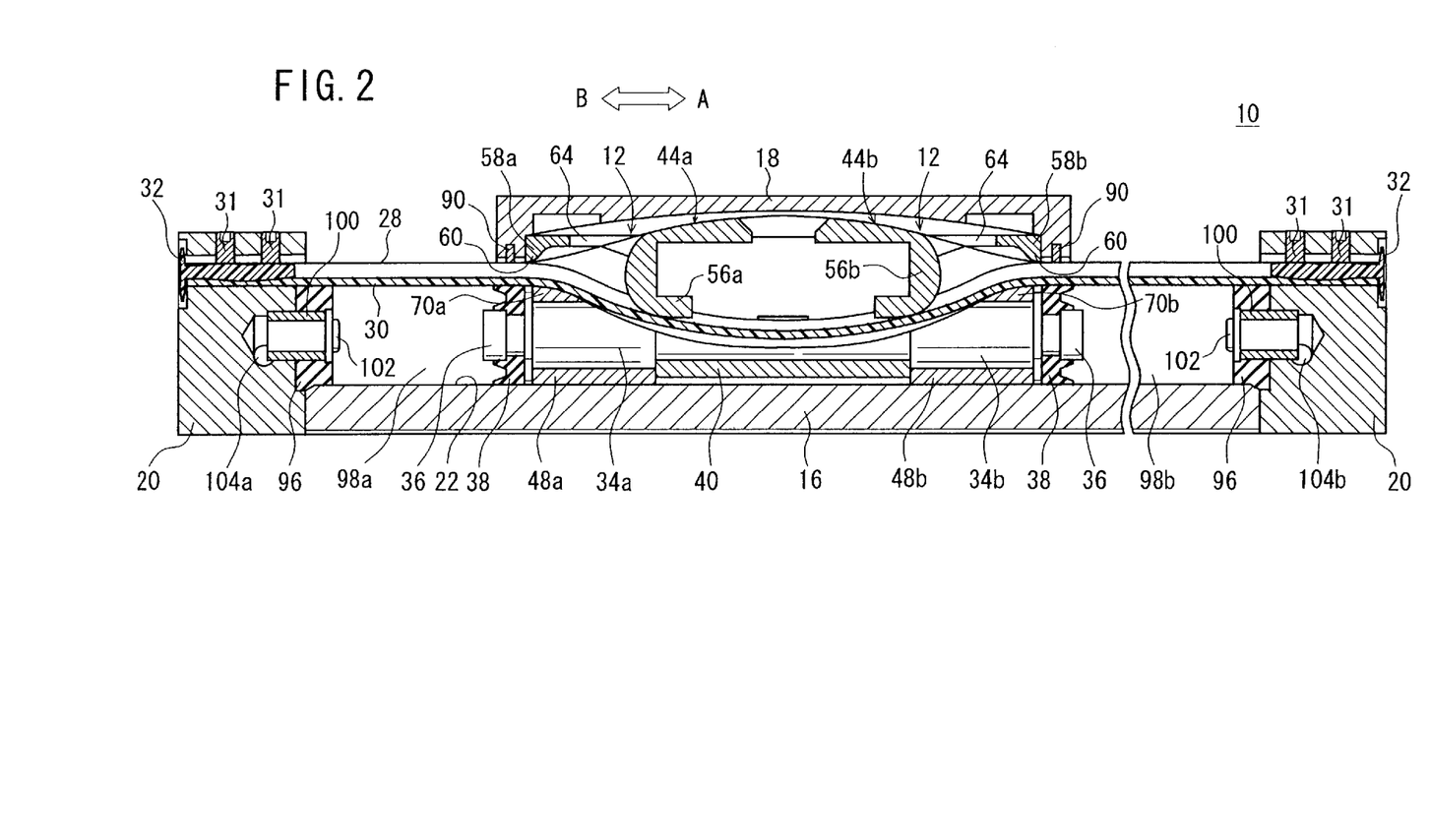
FIG. 2 is a longitudinal sectional view taken along a line II—II shown in FIG. 1.

As shown in FIG. 2, fixing members 32 fix both ends of the upper belt 28 and the lower belt 30. A pair of screw members 31 install each of the fixing members 32 to a hole of the end plate 20.

As shown in FIGS. 1 and 4, sensor attachment long grooves 33 are formed longitudinally on both side surfaces of the cylinder tube 16. For example, an unillustrated sensor for detecting the position of the piston 34a, 34b (see FIG. 2) as described later on is attached to the sensor attachment long groove 33.

Figure 6:
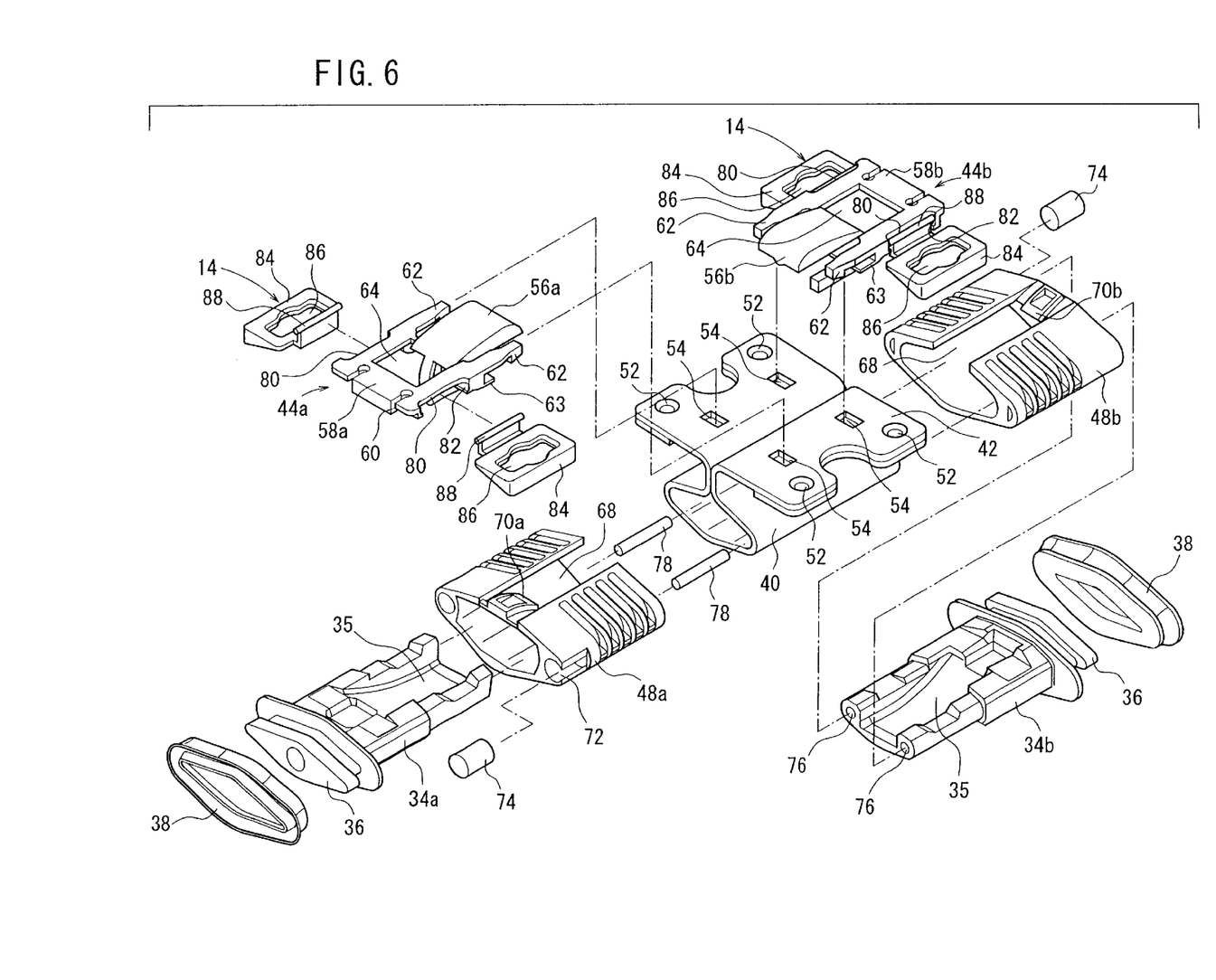
FIG. 6 is an exploded perspective view illustrating the belt guide mechanism according to the embodiment of the present invention.
Figure 7:
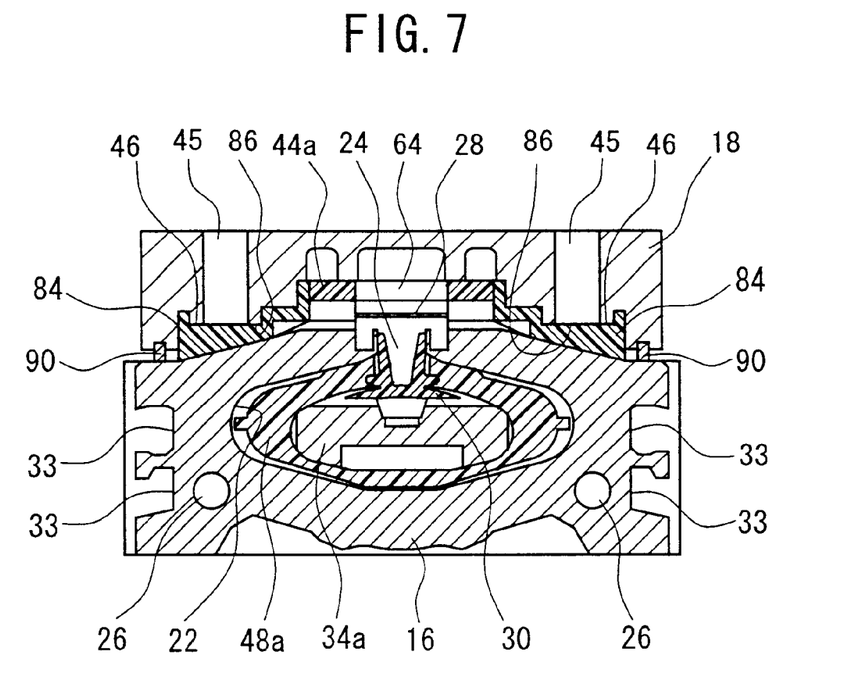
FIG. 7 is a vertical sectional view taken along a line VII—VII shown in FIG. 1.

As shown in FIGS. 6 and 7, the pistons 34a, 34b are inserted movably back and forth into the bore 22 of the cylinder tube 16. A cross sectional shape of each of the pistons 34a, 34b corresponds to the bore 22.

Figure 3:
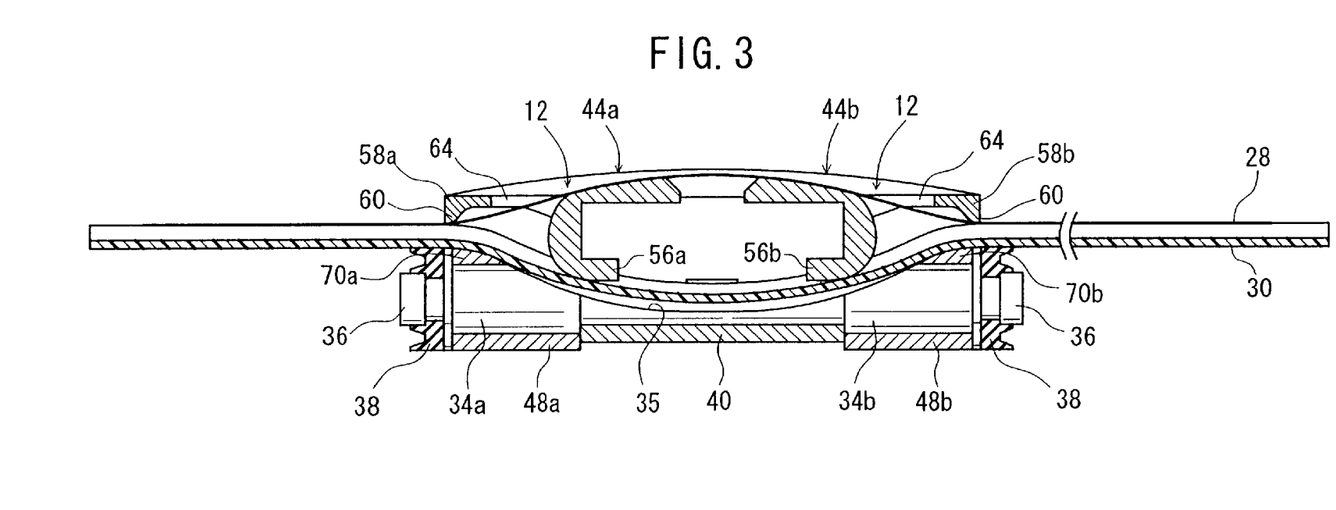
FIG. 3 is, with partial omission, a longitudinal sectional view illustrating the belt guide mechanism.

As shown in FIGS. 2 and 3, projections 36 are formed at both longitudinal ends of the pistons 34a, 34b. As shown in FIGS. 2 and 6, a seal member 38 is attached to the circumferential edge of the projection 36. The seal member 38 effects sealing between the piston 34a, 34b and the inner wall surface of the bore 22.

A piston yoke 40 is installed to the pistons 34a, 34b. The piston yoke 40 protrudes upward of the pistons 34a, 34b. A pair of belt guide members 44a, 44b are attached to both upper ends of the piston yoke 40 as described later on. The slider 18 is connected to the pistons 34a, 34b. The piston yoke 40 and the belt guide members 44a, 44b are covered with the slider 18. Attachment screw holes 45 (see FIGS. 1 and 8) for attaching an unillustrated workpiece or the like are formed on the upper surface of the slider 18. A plurality of projections 46 (see FIGS. 7 and 8) are formed under the slider 18 and protrude by a predetermined length.

Figure 5:
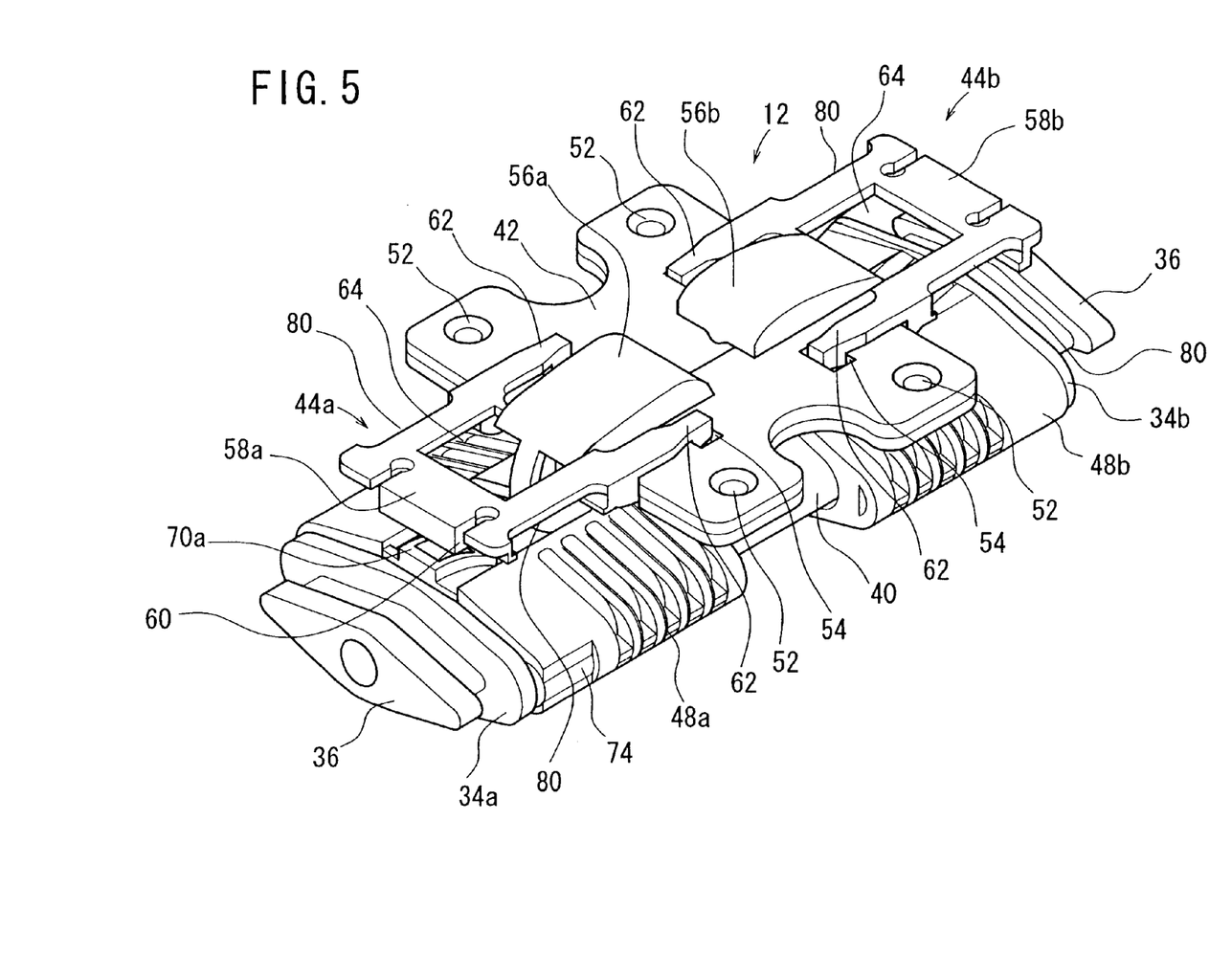
FIG. 5 is a perspective view illustrating the belt guide mechanism according to the embodiment of the present invention.

As shown in FIGS. 5 and 6, the belt guide mechanism 12 comprises a guide body 42, the pair of belt guide members (first guide members) 44a, 44b which are connected to both ends of the piston yoke (see FIG. 2) of the guide body 42, a pair of wear rings (second guide members) 48a, 48b which partially surround a cylindrical section of the guide body 42, and the pistons 34a, 34b which are inserted into the wear rings 48a, 48b. A curved guide surface 35 for guiding the lower belt 30 is formed on each of the pistons 34a, 34b.

Screw holes 52 for fixing the slider 18 are formed at both sides which are spaced from each other by predetermined distances on the upper surface of the guide body 42. Engaging grooves 54 (see FIGS. 5 and 6) are formed at positions which are separated inward from the screw holes 52 by predetermined distances. Each of the engaging grooves 54 has a substantially oblong shape. First pawls 62 of the belt guide members 44a, 44b engage with the engaging grooves 54 as described later on.

Figure 8:
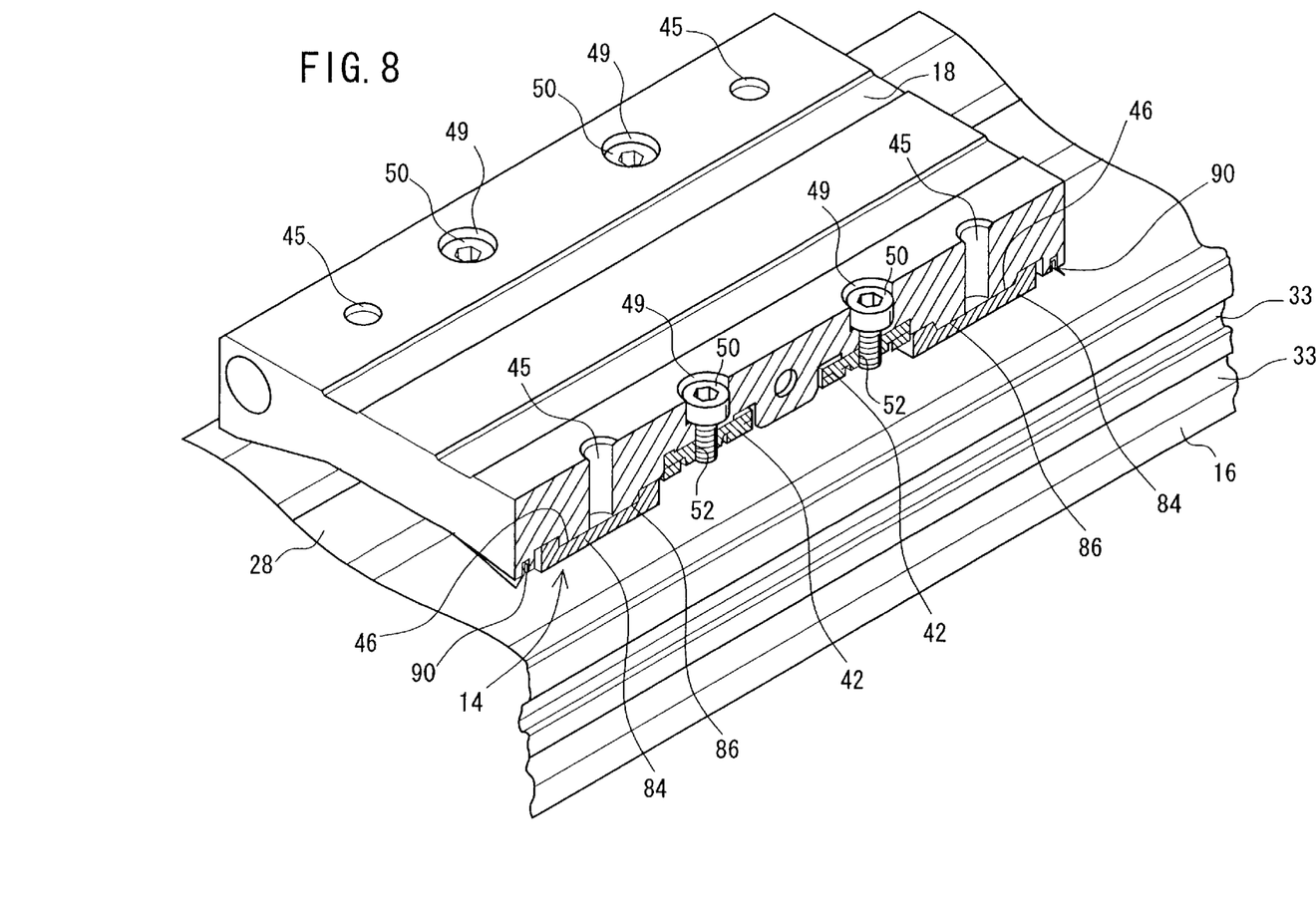
FIG. 8 is, with partial omission and cutaway, a perspective view near bearings and a slider of the rodless cylinder.

As shown in FIG. 8, the screw members 50 are screwed into the screw holes 52 of the guide body 42 via through-holes 49 formed through the slider 18. Accordingly, the guide body 42 is fixed to the slider 18.

As shown in FIG. 6, each of the belt guide members 44a, 44b comprises a belt separator 56a, 56b which is formed of, for example, a resin material and which has a cross section of a substantially C shape, a belt holder section (holder section) 58a, 58b which protrudes toward one end from a substantial center of the belt separator 56a, 56b, and the first pawls 62 and second pawls 63 which protrude on both sides which are spaced by predetermined distances from the belt separator 56a, 56b.

A belt insertion hole 64 is formed between the belt holder section 58a, 58b and the belt separator 56a, 56b disposed at the substantial center of the belt guide member 44a, 44b. The belt insertion hole 64 has a substantially square shape. The upper belt 28 is inserted into the belt insertion hole 64. As shown in FIG. 2, the belt separator 56a, 56b has a curved shape so that the sliding resistances of the upper belt 28 and the lower belt 30 may not be excessively large when the upper belt 28 and the lower belt 30 are guided.

The belt separator 56a, 56b is interposed between the upper belt 28 and the lower belt 30 which are vertically separated from each other and which are curved. The upper belt 28 is guided along the space between the belt separator 56a, 56b and the slider 18. The lower belt 30 is guided along the space between the belt separator 56a, 56b and the piston 34a, 34b.

The belt holder section 58a, 58b has a projection 60 (see FIGS. 2 and 3) which protrudes downward by a predetermined length. The upper belt 28 is pressed toward the cylinder tube 16 by the projection 60. Accordingly, the upper belt 28 and the lower belt 30 approach one another.

As shown in FIG. 6, the first pawls 62 protrude downward by a predetermined distance. The first pawls 62 are formed on both sides of the belt separator 56a, 56b. The first pawls 62 are installed to the engaging grooves 54 of the upper surface of the guide body 42. Further, the second pawls 63 are installed to the lower surface of the guide body 42. Therefore, the guide body 42 and the belt guide member 44a, 44b are connected integrally to one another. When the slider 18 moves, the belt separator 56a, 56b separates the upper belt 28 and the lower belt 30 from each other and the belt holder section 58a, 58b approaches the upper belt 28 and the lower belt 30 to one another.

As shown in FIG. 7, each of the wear rings 48a, 48b has a cross sectional shape corresponding to the bore 22. A cutout 68 (see FIG. 6) is formed on the upper surface of the bore. The cutout 68 has a substantially oblong cross section.

As shown in FIG. 6, a lower belt guide section 70a, 70b having a substantially oblong shape for guiding the lower belt 30 is disposed at one end of the cutout 68. A height of one end of the lower belt guide section 70a, 70b is substantially equivalent to the outer circumferential surface of the wear ring 48a, 48b. The other end of the lower belt guide section 70a, 70b is slightly curved downward.

That is, the lower belt guide section 70a, 70b has a curved shape. Therefore, the sliding resistance of the lower belt 30 does not excessively increase when the lower belt 30 is guided (see FIG. 2).

As shown in FIG. 6, a magnet 74 is installed to a hole 72 which is formed at one end of the wear ring 48a, 48b. The magnetic field of the magnet 74 is sensed by the unillustrated sensor which is installed to the sensor attachment long groove 33 of the cylinder tube 16 (see FIGS. 1 and 4). Therefore, the position of the piston 34a, 34b is detected. Pins 78 are forcibly inserted into a pair of pin holes 76 formed at end surfaces of the two pistons 34a, 34b. Thus, the two pistons 34a, 34b are connected to one another.

The pistons 34a, 34b are engageably and integrally inserted inside the wear rings 48a, 48b. That is, the pistons 34a, 34b are connected to one another by the pair of pins 78 forcibly inserted into the wear rings 48a, 48b. Further, the wear rings 48a, 48b are connected integrally to the pistons 34a, 34b.

As shown in FIGS. 4 and 6, each of the bearing sections 14 has a bearing 84. The bearing 84 engages with a bearing-engaging groove 82 formed in a side surface recess 80 of each of the belt guide members 44a, 44b.

The bearing 84 has a bearing-engaging recess 86 of a substantially oblong shape. The bearing-engaging recess 86 is formed at a substantial center of the bearing 84. The projection 46 of the slider 18 (see FIGS. 7 and 8) is inserted into the bearing-engaging recess 86. Further, the bearing 84 has a protruding engaging shaft 88 which is installed to the bearing-engaging groove 82 formed in the side surface recess 80 of the belt guide member 44a, 44b. The number of the bearing-engaging recesses 86 of the bearings 84 corresponds to the number of the projections 46 of the slider 18. The engaging shafts 88 are detachably installed to the bearing-engaging grooves 82.

As shown in FIGS. 7 and 8, a scraper 90 of a substantially oblong shape is disposed along the outer side surfaces of the slider 18 on the lower surface of the slider 18. The scraper 90 contacts the upper belt 28 and the upper surface of the cylinder tube 16. The scraper 90 prevents dust or the like from entering into the space between the slider 18 and the upper belt 28.

As shown in FIGS. 1 and 2, the end plates 20 are attached to the both ends of the cylinder tube 16 for closing the openings of the bore 22. Screw-installing holes 92 are formed on one end surface of the end plate 20. The end plate 20 is integrally assembled to the cylinder tube 16 by installing screw members 94 to screw holes 95 of the cylinder tube 16 (see FIG. 4) via the screw-installing holes 92.

As shown in FIG. 2, the space between the end plate 20 and the bore 22 is closed airtight by a gasket 96 which is formed of, for example, a rubber material. Cylinder chambers 98a, 98b are formed between the end plates 20 and the pistons 34a, 34b in the bore 22.

Hollow cylindrical members 100 connected to the other end surfaces of the end plates 20 are inserted substantially centrally through the gaskets 96. When the slider 18 arrives at the displacement terminal end, the projection 36 of the piston 34a (34b) abuts against a damper 102 of the gasket 96. Thus, the slider 18 stops.

As shown in FIGS. 1 and 2, ports 104a, 104b are formed on the side surfaces of the end plates 20 respectively. The ports 104a, 104b communicate with the cylinder chambers 98a, 98b in the cylinder tube 16 via unillustrated passages in the end plates 20 or the fluid bypass passages 26 of the cylinder tube 16 (see FIG. 4).

A pressure fluid supply source is connected to the ports 104a, 104b, for example, via an unillustrated directional control valve. The pressure fluid is selectively supplied from the pressure fluid supply source to one of the ports 104a, 104b.

As shown in FIG. 1, a pair of outer ports 106 are formed on one end surface of the end plate 20. Each of the outer ports 106 communicates with the cylinder chamber 98a, 98b (see FIG. 2) in the cylinder tube 16 via an unillustrated passage in the end plate 20 or the fluid bypass passage 26 of the cylinder tube 16 (see FIG. 4). A sealing screw 108 is screwed into and seals the outer port 106.

The rodless cylinder 10 incorporating the belt guide mechanism 12 according to the embodiment of the present invention is basically thus constructed. Next, its operation, function, and effect will be explained.

At first, the steps of assembling the belt guide mechanism 12 will be explained. As shown in FIG. 6, the magnet 74 is installed into the hole 72 of the wear ring 48a. The wear ring 48a engages with the lower portion of the guide body 42 along the cutout 68.

Subsequently, the ends of the pins 78 are forcibly inserted into the pin holes 76 of the piston 34a. The piston 34a is inserted into and engages with the wear ring 48a. The piston 34b is also inserted into and engages with the wear ring 48b in the same manner. The magnet 74 is not disengaged because the hole 72 for installing the magnet 74 is closed.

Subsequently, the other ends of the pins 78 which are forcibly inserted into the piston 34a are inserted into the pin holes 76 of the piston 34b. Accordingly, the pistons 34a, 34b and the wear rings 48a, 48b are integrally assembled.

Subsequently, the seal members 38 are installed to the circumferential edges of the projections 36 of the pistons 34a, 34b. The first pawls 62 of the belt guide members 44a, 44b are installed to the engaging grooves 54 on the upper surface of the guide body 42. The second pawls 63 are installed to the lower surface of the guide body 42. Therefore, the belt guide members 44a, 44b are fixed to the guide body 42.

Subsequently, the engaging shafts 88 are installed to the bearing-engaging grooves 82 in the side surface recesses 80 of the belt guide members 44a, 44b in a posture in which the engaging shafts 88 of the bearings 84 are disposed upward and the bearing-engaging recesses 86 are disposed downward.

Finally, the upper belt 28 is inserted over the belt separators 56a, 56b of the belt guide members 44a, 44b into the belt insertion holes 64. Therefore, the upper belt 28 abuts against the lower portions of the projections 60 of the belt holder sections 58a, 58b.

The lower belt 30 abuts against the upper surface of the lower belt guide section 70a of the wear ring 48a and the lower portion of the belt separator 56a of the belt guide member 44a. The lower belt 30 is inserted into the pistons 34a, 34b and the guide body 42. Subsequently, the lower belt 30 is assembled so that the lower belt 30 may abut against the lower portion of the belt separator 56b of the belt guide member 44b and the upper surface of the lower belt guide section 70b of the wear ring 48b. Thus, the assembling operation of the belt guide mechanism 12 is completed.

In the embodiment of the present invention, the belt guide members 44a, 44b have the belt holder sections 58a, 58b for holding the upper belt 28 and the belt separators 56a, 56b for separating the upper belt 28 from the lower belt 30. The belt holder sections 58a, 58b and the belt separators 56a, 56b are integrally formed in the belt guide members 44a, 44b.

Therefore, the number of components can be reduced. Accordingly, the assembling can be performed more conveniently, and the assembling operability and the operation efficiency can be improved.

The exploded perspective view of the belt guide mechanism 12 shown in FIG. 6 illustrates a state in which the first bearings 84 are disassembled from the belt guide member 44a, and the second bearings 84 are assembled to the belt guide member 44b.

The rodless cylinder 10 incorporating the belt guide mechanism 12 thus assembled is operated as follows. That is, as shown in FIG. 2, when the pressure fluid (for example, compressed air) is supplied to the port 104a, the pressure fluid is introduced into the cylinder chamber 98a in the cylinder tube 16 via the unillustrated passage. When the piston 34a is pressed by the pressure fluid in the direction of the arrow A shown in FIG. 2, the slider 18 moves in the direction of the arrow A together with the piston 34a.

As the slider 18 moves, the belt separator 56b opens the upper belt 28 and the lower belt 30 of the slider 18 which have been closed by the belt holder section 58b of the belt guide member 44b and the lower belt guide section 70b.

Further, as the slider 18 moves, the belt holder section 58a of the belt guide member 44a and the lower belt guide section 70a close, near the center of the slider 18, the upper belt 28 and the lower belt 30 which have been opened by the belt separator 56a.

That is, the slider 18 moves along the cylinder tube 16 while sealing the slit 24 with the upper belt 28 and the lower belt 30 to keep the interior of the bore 22 airtight.

The slider 18 stops when the slider 18 further moves and the projection 36 of the piston 34b abuts against the damper 102 of the gasket 96.

By contrast, when the unillustrated directional control valve is switched to supply the pressure fluid to the port 104b, the pressure fluid is introduced into the cylinder chamber 98b in the cylinder tube 16 via the unillustrated passage. When the piston 34b is pressed by the pressure fluid in the direction of the arrow B shown in FIG. 2, the slider 18 moves in the direction of the arrow B together with the piston 34b.

In this situation, the operation opposite to the case in which the slider 18 moves in the direction of the arrow A is performed. That is, the belt separator 56a of the belt guide member 44a opens the upper belt 28 and the lower belt 30 which have been closed by the belt holder section 58a of the belt guide member 44a and the lower belt guide section 70a. Further, the upper belt 28 and the lower belt 30 which have been opened by the belt separator 56b are closed by the belt holder section 58b and the lower belt guide section 70b.

After the slider 18 further moves, it stops as the projection 36 of the piston 34a abuts against the damper 102 of the gasket 96.

As described above, in the embodiment of the present invention, the belt guide members 44a, 44b have the belt holder sections 58a, 58b for holding the upper belt 28 and the belt separators 56a, 56b for separating the upper belt 28 from the lower belt 30. The belt holder sections 58a, 58b and the belt separators 56a, 56b are integrally formed in the belt guide member 44a, 44b. Accordingly, the belt guide mechanism 12 conventionally made up of six or more components on the both sides of the belt (the pair of belt separators 6a, 6b, the pair of holder plates 7a, 7b, and the pair of wear rings 9a, 9b) can be made up of the four components (the pair of belt guide members 44a, 44b and the pair of wear rings 48a, 48b). Therefore, the number of components is reduced for performing the assembling more conveniently. The assembling operability and the operation efficiency can be further improved and the cost can be reduced.

The belt separator 6a, 6b and the holder plate 7a, 7b are integrated into only the belt guide member 44a, 44b. Therefore, there is no dimensional error between the belt separator 6a, 6b and the holder plate 7a, 7b, improving the dimensional accuracy of the belt guide member 44a, 44b.

That is, the dimensional and positional accuracy of the belt guide member 44a, 44b is increased for improving the performance of the upper belt 28 and the lower belt 30 to follow the belt guide member 44a, 44b. Therefore, the sliding resistance is mitigated for further improving the durability of the upper and lower belts 28, 30 and the belt guide member 44a, 44b.

Further, the bearings 84 integrally engage with the belt guide members 44a, 44b for the avoidance of the conventional complicated operation requiring an operator to visually perform the positional adjustment for fixing the slider 4. Therefore, it is possible to position and fix the slider 18 easily and conveniently.

Further, the bearings 84 are rotatable about the support points on the engaging shafts 88. Accordingly, the projections 46 of the slider 18 are easily engageable for assembling the slider 18.

Consequently, when the slider 18 is fixed onto the upper surface of the guide body 42 of the belt guide mechanism 12, the slider 18 can be positioned and fixed easily and conveniently by the screw members 50. The assembling operability and the operation efficiency can be further improved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A belt guide mechanism for guiding a first belt and a second belt for closing a slit of a body of a pressure fluid-driven apparatus, said slit extending in an axial direction of a cylinder tube, said belt guide mechanism comprising:
   a guide body;
   a first guide member which engages with engaging grooves of said guide body and which has a belt separator for separating said first belt and said second belt from each other and a holder section for pressing said first belt toward said second belt, said belt separator and said holder section being integrally formed in said first guide member; and
   a second guide member which is disposed opposite to said holder section of said first guide member and which guides said second belt.

2. The belt guide mechanism according to claim 1, wherein a belt insertion hole for inserting said first belt is formed between said belt separator and said holder section.

3. The belt guide mechanism according to claim 1, wherein said first guide member has detachable bearings for supporting a slider of said pressure fluid-driven apparatus.

4. The belt guide mechanism according to claim 3, wherein said bearings have engaging recesses for supporting projections of said slider, a number of said engaging recesses corresponding to a number of said projections.

5. A belt guide mechanism for guiding an upper belt and a lower belt for closing a slit which extends in an axial direction of a cylinder tube,
   said belt guide mechanism being disposed in a rodless cylinder for moving a slider in said axial direction of said cylinder tube together with a piston, said piston being moved along a bore of said cylinder tube by pressure fluid supplied into said cylinder tube, said belt guide mechanism comprising:
- a guide body which is connected to said piston and which moves together with said piston;
- a pair of belt guide members which engage with engaging grooves of said guide body facing a space between said slider and one surface of said cylinder tube having said slit, said pair of belt guide members having a pair of belt separators for separating said upper belt and said lower belt from each other and belt holder sections for pressing said upper belt toward said lower belt, and said pair of belt separators and said belt holder sections being integrally formed in said pair of belt guide members; and
- a pair of wear rings which are disposed on said piston opposite to said belt holder sections of said belt guide members and which guides said lower belt.

6. The belt guide mechanism according to claim 5, wherein a belt insertion hole for inserting said upper belt is formed between said belt separator and said belt holder section.

7. The belt guide mechanism according to claim 5, wherein said belt guide member has detachable bearings for supporting said slider.

8. The belt guide mechanism according to claim 7, wherein said bearings have engaging recesses for supporting projections of said slider, a number of said engaging recesses corresponding to a number of said projections.

* * * * *